March 26, 1940.    B. W. GROSVENOR ET AL    2,195,005
PROPORTIONER
Filed Oct. 17, 1938    4 Sheets-Sheet 1

INVENTORS
BRUCE W. GROSVENOR
BY   CLEMENT P. GRIFFITH.
Edmund W. E. Kamm
ATTORNEY.

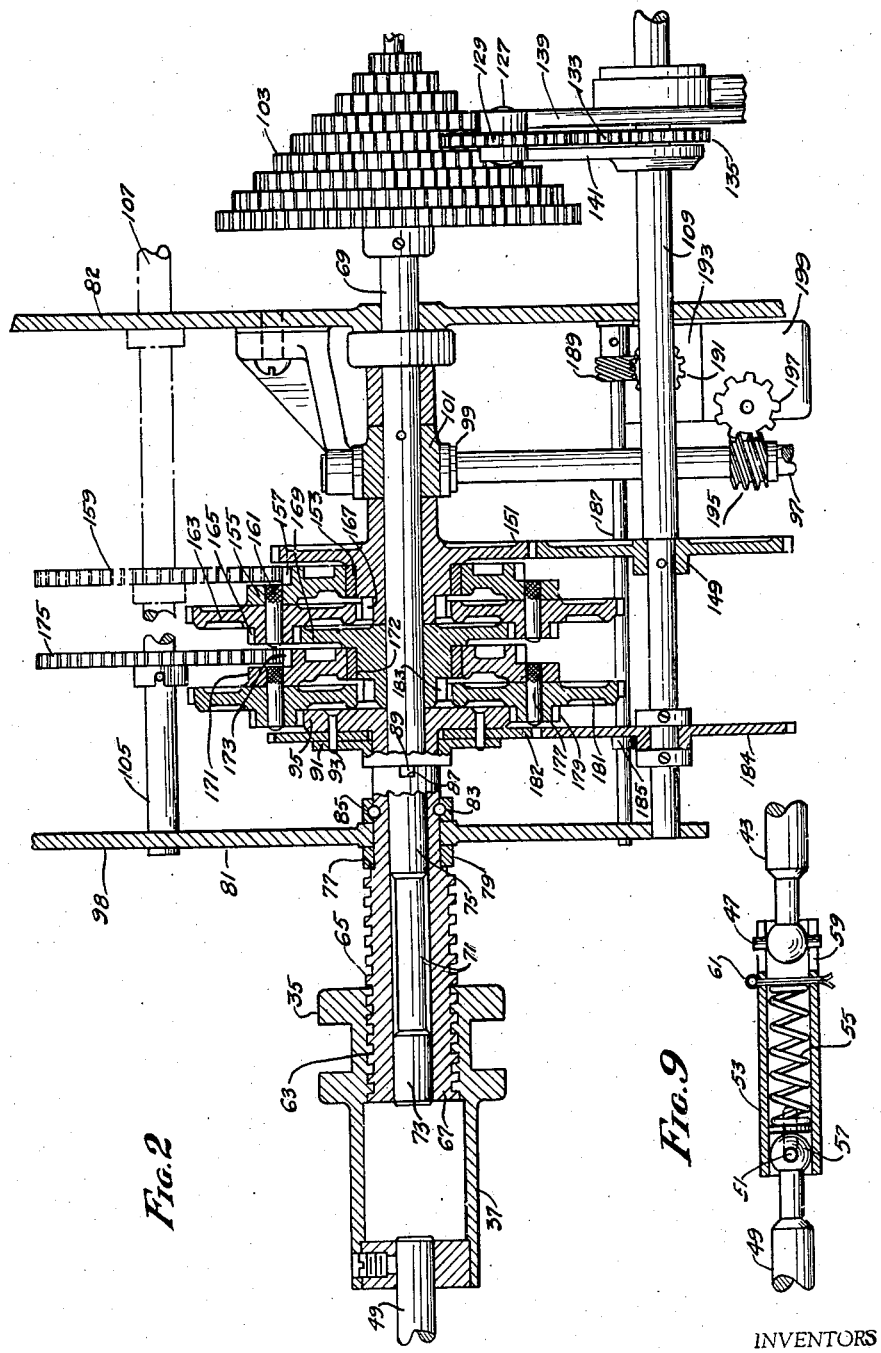

March 26, 1940.   B. W. GROSVENOR ET AL   2,195,005
PROPORTIONER
Filed Oct. 17, 1938   4 Sheets-Sheet 3
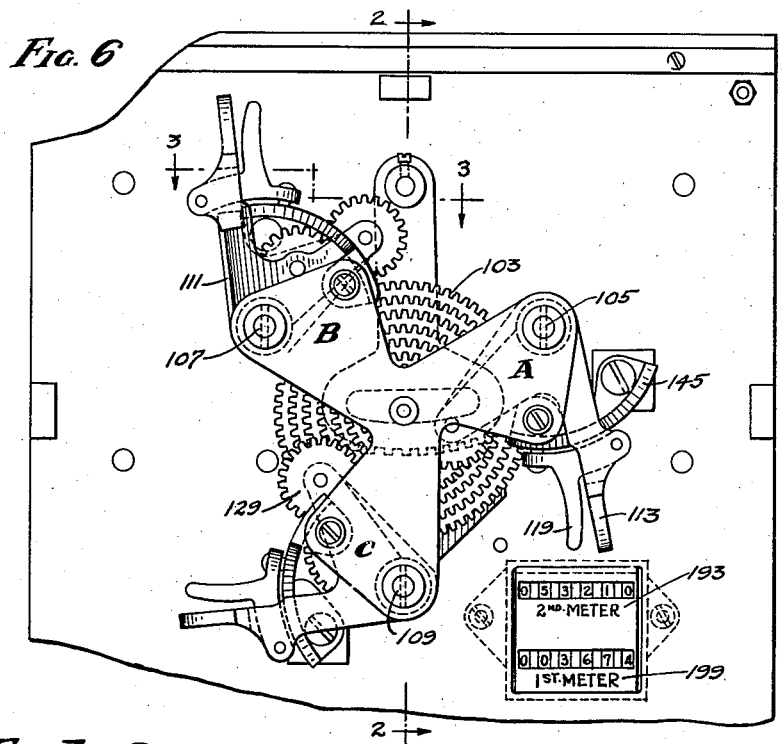
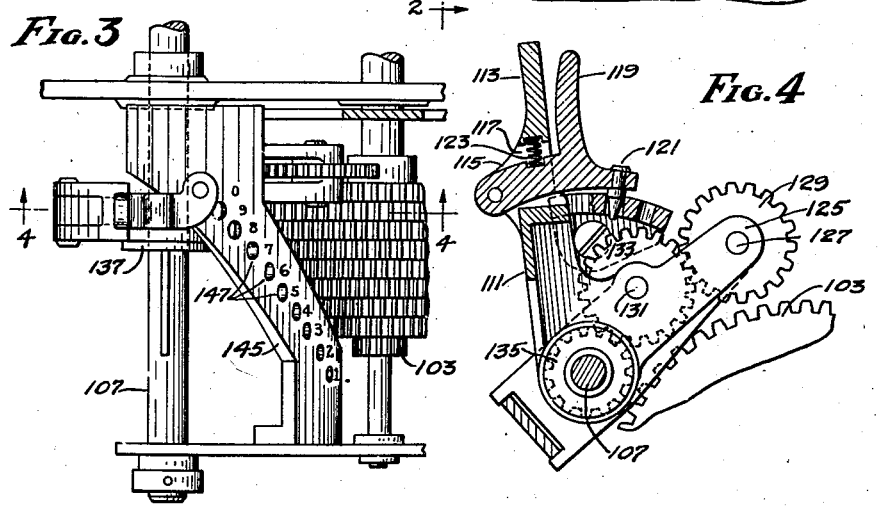
INVENTORS
BRUCE W. GROSVENOR
CLEMENT P. GRIFFITH
BY Edmund W. E. Kamm
ATTORNEY.

March 26, 1940.  B. W. GROSVENOR ET AL  2,195,005
PROPORTIONER
Filed Oct. 17, 1938    4 Sheets-Sheet 4

INVENTORS
BRUCE W. GROSVENOR
CLEMENT P. GRIFFITH.
BY Edmund W. E. Kamm
ATTORNEY.

Patented Mar. 26, 1940

2,195,005

UNITED STATES PATENT OFFICE 2,195,005

PROPORTIONER

Bruce W. Grosvenor and Clement P. Griffith, Fort Wayne, Ind., assignors to S. F. Bowser & Company, Incorporated, Fort Wayne, Ind., a corporation of Indiana Application October 17, 1938, Serial No. 235,434

6 Claims. (Cl. 221—96)

This invention relates to a mechanism for dispensing simultaneously and in definite proportions to each other a plurality of fluids, and if desired, for mixing these liquids as they are dispensed. More specifically, the invention comprises a plurality of meters, each of which is arranged to measure a different fluid, together with flow controlling means for controlling the rate of discharge of one meter with respect to that of another so that the volume of fluid discharged by one meter will, in any given period of time, be in predetermined proportion to that discharged by another meter with which it is related.

One of the objects of the invention is to provide a mechanism by means of which the proportions of the fluids may be varied within a wide range and by small increments.

A further object of the invention is to produce a proportioning mechanism in which only the individual fluids, and not the mixture, are metered.

Yet another object of the invention is to produce a proportioning mechanism in which the secondary fluid, that is the fluid having the second largest rate of flow, is proportioned to that having the maximum rate, while the tertiary fluid is proportioned to the secondary fluid and so on throughout the number of fluids handled.

Still another object of the invention is to provide a mechanism in which the volume of fluid dispensed by two immediately adjacent meters may be read at the superior meter, that is, the one dispensing the greater volume of fluid.

Other objects of the invention will become apparent from a consideration of the specification taken in connection with the accompanying drawings, which are attached hereto and are made a part hereof, and in which:

Figure 2 is a section taken on the line 2—2 of Figure 6, disclosing the change speed mechanism utilized in controlling the fluids.

Figure 3 is a plan view, taken on the line 3—3 of Figure 6, of the proportion adjustment means of the speed change mechanism.

Figure 4 is a section taken on line 4—4 of Figure 3.

Figure 6 is an elevation showing the proportion adjustment means of the speed change mechanism.

Figure 9 is a section showing the shaft coupling.

Figure 1:
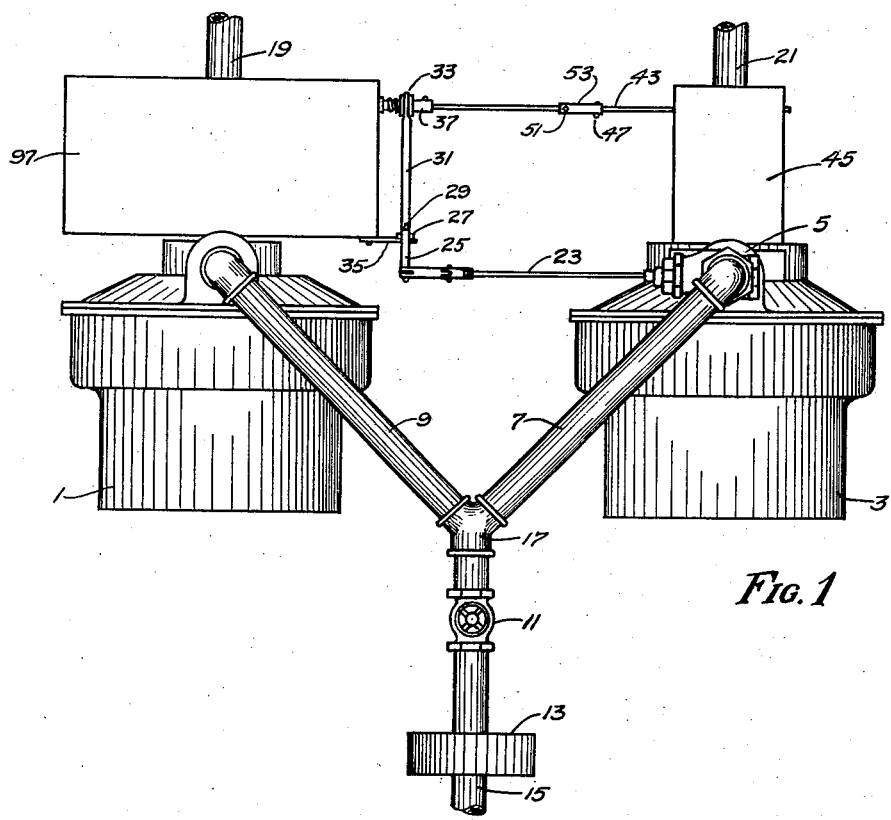
Figure 1 is an elevation showing the invention applied to proportioning two fluids.

Referring to Figure 1, the numeral 1 refers to the primary or maximum quantity meter, 3 represents the secondary meter, having outlets 9 and 7 respectively, which are joined by a Y connection 17 which discharges through a valve 11, and if desired, through a mixing valve or homogenizing device 13 and an outlet 15. The device 13 may be of any suitable well known construction. Pipes 19 and 21 are inlet conduits leading to the primary and secondary meters respectively.

A valve 5 is inserted in the discharge from the secondary meter 3, and is connected by a link 23 to one arm 25 of a double armed lever which comprises a hub 27 which pivots on an axle 29 supported on a bracket 35. The second arm 31 of the lever is formed with a clevis or yoke 33 which rides in a groove 35 formed in a nut 37 later to be described.

A shaft 39 is driven by the secondary meter 3, and carries a worm 41. A frame 45 is mounted on the meter 3 and supports upon suitable bearings therein, a shaft 43 which extends beyond the side of the frame and carries a pin 47. A worm gear 44 which meshes with worm 41 is fixed on shaft 43.

The nut 37 is formed with a reduced extension 49 which is provided with a transverse pin 51. A sleeve 53 is adapted to receive both of the shafts 49 and 43. The sleeve is provided with a blind slot 57 which is adapted to receive the pin 51 in extension 49. An open ended slot 59 is provided in the opposite end of the sleeve so as to receive the pin 47 in shaft 43. A spring 55 is inserted in the sleeve and bears at one end on extension 49 and at the other on a stop 61. This connection permits the disconnection of the two meters by simply moving the sleeve in a direction to disengage slot 59 and pin 47. When disconnected, either meter may be used to discharge any amount of fluid. Of course, the meter not being used, must be shut off by closing a valve in the inlet line to that meter.

Nut 37 is internally threaded, as at 63, and receives the end of a sleeve 67 which carries threads 65 at one end. The sleeve 67 is mounted for rotation on shaft 69 of the speed change mechanism, which is recessed at 71 to provide two bearings 73 and 75 for the sleeve. The sleeve is provided with a shoulder 77 which abuts a ring 79, which, in turn, abuts one of the housing end plates 81. A ring 83 is passed over the sleeve and abuts the other side of the end plate so as to support the sleeve against axial motion. Pins 85, passing through this collar, and the sleeve hold the collar in place.

The sleeve is provided with notches 87 at the end face, opposite the end bearing the threads. These notches are adapted to receive lugs 89 formed on a flange 91 which is connected as by rivets 93 to the final driven gear 95 of the speed change mechanism which is indicated generally by the numeral 98.

The shaft 97 is driven from the maximum quantity meter 1 and through a worm 99; and wheel 101 drives the shaft 69, heretofore described, which has fixed thereto a cone gear 103 which has nine steps. The end plates 81 and 82 form a supporting frame work for the ends of the shaft 69 and shafts 105, 107 and 109.

Each shaft 105, 107 and 109 is provided with a bell crank lever having one arm 111 which is provided with a finger grip 113 and a projection 115. Pivoted to the projection and extending through a perforation 117 in said lever, is a T-shaped lever having a finger grip 119 and having a depending pin 121. A spring 123 is provided between one wall of the perforation and the T-shaped lever and is adapted to rotate said lever in a clockwise direction. The other arm 125 of said bell crank is provided with a pivot 127 upon which is supported a gear 129. A second pivot 131 supports an idler gear 133, which is adapted to mesh with said gear 129 and a gear 135, which is fixed to hub 137 keyed for sliding motion with respect to said shaft and adapted to transmit rotation thereto.

The arm 125 comprises two parts, 139 and 141, which lie on opposite sides of the gears 129, 133 and 135. The bell crank is free to rotate about its supporting shaft to lift the gear 129 away from the gears of the cone with which it is adapted to mesh. By lifting said gear 129 out of mesh as described, and sliding the bell crank longitudinally on the shaft, it is possible to mesh said gear 129 with any of the nine gears on the cone.

A frame element 145 is provided with openings 147, one corresponding to each of the nine gears on the cone and to a neutral position of the gear 129, for the reception of the pin 121 attached to the T-shaped lever so as to retain the gear 129 in mesh with the selected step of the cone gear, or out of mesh with the cone gear and in a locked condition. Each of the shafts 105, 107 and 109 is provided with bell crank levers and gears, etc., which are similar in construction and arrangement to those described above. Further description of these elements is believed to be unnecessary.

It is to be noted that when any of the bell cranks are moved to the position shown in Figure 4, whereby the pin 121 engages the innermost opening 147, the gear 129 will be retained entirely out of contact with cone 103 and will be locked against turning by contact with a portion of element 145.

The shaft 109, which is the lowest order shaft, drives a gear 149 which drives the first sun gear 151 of the differential mechanism. This gear is mounted for free rotation about shaft 69 and immediately adjacent to gear 101. Mounted for rotation relative to this sun gear on the hub 153 thereof, is a planetary spider 155. The latter is provided with a gear 157, formed integrally therewith, which is in mesh with a gear 159 fixed to the shaft 107 which is the intermediate order shaft. The spider 155 carries pins 161 upon which are mounted planetary gears 163 and 165 which are integral with each other. The gear 163 meshes with the second gear 167 formed on the first sun gear 151 beyond the hub 153 thereof, while the smaller gear 165 meshes with the second sun gear 169.

A second planetary spider 171 is mounted upon the hub 172 of the second sun gear, and is provided with a gear 173 which is adapted to be driven by the gear 175 on shaft 105 which is the superior order shaft. The spider 171 carries pins 177 upon which are mounted the planetary gears 179 and 181. Gear 181 meshes with a gear 183 formed on the second sun gear beyond said hub 172, while the smaller gear 179 meshes with a gear 95 which is the final driven gear of the mechanism 97.

A gear 182 is fixed to gear 95 by means of the pins 93 which have been described heretofore. A gear 184 is mounted for free rotation upon an extension of the shaft 109 and is connected by suitable gearing, including a gear 185, a shaft 187 mounted in the end plates 81 and 82, a worm 189 and a worm wheel 191 which drives directly the gallonage counter 193 which represents a volume of fluid dispensed by the secondary meter. A worm 195, which is mounted to rotate with the shaft 97 heretofore described, drives a worm wheel 197 to drive the register 199 which indicates the volume discharged by the primary or maximum volume meter.

The following table represents the settings of the three bell crank members to secure certain desired proportions between the volumes discharged by the primary and secondary meters.

In the chart the letter A represents the setting of the bell crank lever which is connected with the shaft 105 which is the superior order shaft; B represents the bell crank connected with the shaft 107 which is the intermediate order shaft, and C represents a bell crank which is connected with the shaft 109 which is the inferior order shaft.

The numbers 1, 2, 3, etc., represent the steps on the cone gear 103 reading from right to left of Figure 3 and the numeral 0 represents the locked position of the gear 129 when the bell crank has moved to its fartherest left hand position and beyond the last step of the cone gear 103.

The numerals in the first column under the per cent symbol represent the percenage of the fluid discharged through the secondary meter as compared with that discharged by the maximum quantity meter. In other words, the symbol 100 indicates that the quantity discharged through the secondary meter is the same as that discharged through the primary meter; whereas, the symbol ½ represents that the volume discharged through the secondary meter is only one-half of one per cent of the volume discharged through the primary meter in a predetermined length of time.

DIFFERENTIAL CONTROL CHART

| Percent | A | B | C | Percent | A | B | C | Percent | A | B | C | Percent | A | B | C |
|---|---|---|---|---|---|---|---|---|---|---|---|---|---|---|---|
| 100 | 2 | 0 | 0 | 74½ | 1 | 4 | 9 | 49½ | 0 | 9 | 9 | 24½ | 0 | 4 | 9 |
| 99½ | 1 | 9 | 9 | 74 | 1 | 4 | 8 | 49 | 0 | 9 | 8 | 24 | 0 | 4 | 8 |
| 99 | 1 | 9 | 8 | 73½ | 1 | 4 | 7 | 48½ | 0 | 9 | 7 | 23½ | 0 | 4 | 7 |
| 98½ | 1 | 9 | 7 | 73 | 1 | 4 | 6 | 48 | 0 | 9 | 6 | 23 | 0 | 4 | 6 |
| 98 | 1 | 9 | 6 | 72½ | 1 | 4 | 5 | 47½ | 0 | 9 | 5 | 22½ | 0 | 4 | 5 |
| 97½ | 1 | 9 | 5 | 72 | 1 | 4 | 4 | 47 | 0 | 9 | 4 | 22 | 0 | 4 | 4 |
| 97 | 1 | 9 | 4 | 71½ | 1 | 4 | 3 | 46½ | 0 | 9 | 3 | 21½ | 0 | 4 | 3 |
| 96½ | 1 | 9 | 3 | 71 | 1 | 4 | 2 | 46 | 0 | 9 | 2 | 21 | 0 | 4 | 2 |
| 96 | 1 | 9 | 2 | 70½ | 1 | 4 | 1 | 45½ | 0 | 9 | 1 | 20½ | 0 | 4 | 1 |
| 95½ | 1 | 9 | 1 | 70 | 1 | 4 | 0 | 45 | 0 | 9 | 0 | 20 | 0 | 4 | 0 |
| 95 | 1 | 9 | 0 | 69½ | 1 | 3 | 9 | 44½ | 0 | 8 | 9 | 19½ | 0 | 3 | 9 |
| 94½ | 1 | 8 | 9 | 69 | 1 | 3 | 8 | 44 | 0 | 8 | 8 | 19 | 0 | 3 | 8 |
| 94 | 1 | 8 | 8 | 68½ | 1 | 3 | 7 | 43½ | 0 | 8 | 7 | 18½ | 0 | 3 | 7 |
| 93½ | 1 | 8 | 7 | 68 | 1 | 3 | 6 | 43 | 0 | 8 | 6 | 18 | 0 | 3 | 6 |
| 93 | 1 | 8 | 6 | 67½ | 1 | 3 | 5 | 42½ | 0 | 8 | 5 | 17½ | 0 | 3 | 5 |
| 92½ | 1 | 8 | 5 | 67 | 1 | 3 | 4 | 42 | 0 | 8 | 4 | 17 | 0 | 3 | 4 |
| 92 | 1 | 8 | 4 | 66½ | 1 | 3 | 3 | 41½ | 0 | 8 | 3 | 16½ | 0 | 3 | 3 |
| 91½ | 1 | 8 | 3 | 66 | 1 | 3 | 2 | 41 | 0 | 8 | 2 | 16 | 0 | 3 | 2 |
| 91 | 1 | 8 | 2 | 65½ | 1 | 3 | 1 | 40½ | 0 | 8 | 1 | 15½ | 0 | 3 | 1 |
| 90½ | 1 | 8 | 1 | 65 | 1 | 3 | 0 | 40 | 0 | 8 | 0 | 15 | 0 | 3 | 0 |
| 90 | 1 | 8 | 0 | 64½ | 1 | 2 | 9 | 39½ | 0 | 7 | 9 | 14½ | 0 | 2 | 9 |
| 89½ | 1 | 7 | 9 | 64 | 1 | 2 | 8 | 39 | 0 | 7 | 8 | 14 | 0 | 2 | 8 |
| 89 | 1 | 7 | 8 | 63½ | 1 | 2 | 7 | 38½ | 0 | 7 | 7 | 13½ | 0 | 2 | 7 |
| 88½ | 1 | 7 | 7 | 63 | 1 | 2 | 6 | 38 | 0 | 7 | 6 | 13 | 0 | 2 | 6 |
| 88 | 1 | 7 | 6 | 62½ | 1 | 2 | 5 | 37½ | 0 | 7 | 5 | 12½ | 0 | 2 | 5 |
| 87½ | 1 | 7 | 5 | 62 | 1 | 2 | 4 | 37 | 0 | 7 | 4 | 12 | 0 | 2 | 4 |
| 87 | 1 | 7 | 4 | 61½ | 1 | 2 | 3 | 36½ | 0 | 7 | 3 | 11½ | 0 | 2 | 3 |
| 86½ | 1 | 7 | 3 | 61 | 1 | 2 | 2 | 36 | 0 | 7 | 2 | 11 | 0 | 2 | 2 |
| 86 | 1 | 7 | 2 | 60½ | 1 | 2 | 1 | 35½ | 0 | 7 | 1 | 10½ | 0 | 2 | 1 |
| 85½ | 1 | 7 | 1 | 60 | 1 | 2 | 0 | 35 | 0 | 7 | 0 | 10 | 0 | 2 | 0 |
| 85 | 1 | 7 | 0 | 59½ | 1 | 1 | 9 | 34½ | 0 | 6 | 9 | 9½ | 0 | 1 | 9 |
| 84½ | 1 | 6 | 9 | 59 | 1 | 1 | 8 | 34 | 0 | 6 | 8 | 9 | 0 | 1 | 8 |
| 84 | 1 | 6 | 8 | 58½ | 1 | 1 | 7 | 33½ | 0 | 6 | 7 | 8½ | 0 | 1 | 7 |
| 83½ | 1 | 6 | 7 | 58 | 1 | 1 | 6 | 33 | 0 | 6 | 6 | 8 | 0 | 1 | 6 |
| 83 | 1 | 6 | 6 | 57½ | 1 | 1 | 5 | 32½ | 0 | 6 | 5 | 7½ | 0 | 1 | 5 |
| 82½ | 1 | 6 | 5 | 57 | 1 | 1 | 4 | 32 | 0 | 6 | 4 | 7 | 0 | 1 | 4 |
| 82 | 1 | 6 | 4 | 56½ | 1 | 1 | 3 | 31½ | 0 | 6 | 3 | 6½ | 0 | 1 | 3 |
| 81½ | 1 | 6 | 3 | 56 | 1 | 1 | 2 | 31 | 0 | 6 | 2 | 6 | 0 | 1 | 2 |
| 81 | 1 | 6 | 2 | 55½ | 1 | 1 | 1 | 30½ | 0 | 6 | 1 | 5½ | 0 | 1 | 1 |
| 80½ | 1 | 6 | 1 | 55 | 1 | 1 | 0 | 30 | 0 | 6 | 0 | 5 | 0 | 1 | 0 |
| 80 | 1 | 6 | 0 | 54½ | 1 | 0 | 9 | 29½ | 0 | 5 | 9 | 4½ | 0 | 0 | 9 |
| 79½ | 1 | 5 | 9 | 54 | 1 | 0 | 8 | 29 | 0 | 5 | 8 | 4 | 0 | 0 | 8 |
| 79 | 1 | 5 | 8 | 53½ | 1 | 0 | 7 | 28½ | 0 | 5 | 7 | 3½ | 0 | 0 | 7 |
| 78½ | 1 | 5 | 7 | 53 | 1 | 0 | 6 | 28 | 0 | 5 | 6 | 3 | 0 | 0 | 6 |
| 78 | 1 | 5 | 6 | 52½ | 1 | 0 | 5 | 27½ | 0 | 5 | 5 | 2½ | 0 | 0 | 5 |
| 77½ | 1 | 5 | 5 | 52 | 1 | 0 | 4 | 27 | 0 | 5 | 4 | 2 | 0 | 0 | 4 |
| 77 | 1 | 5 | 4 | 51½ | 1 | 0 | 3 | 26½ | 0 | 5 | 3 | 1½ | 0 | 0 | 3 |
| 76½ | 1 | 5 | 3 | 51 | 1 | 0 | 2 | 26 | 0 | 5 | 2 | 1 | 0 | 0 | 2 |
| 76 | 1 | 5 | 2 | 50½ | 1 | 0 | 1 | 25½ | 0 | 5 | 1 | ½ | 0 | 0 | 1 |
| 75½ | 1 | 5 | 1 | 50 | 1 | 0 | 0 | 25 | 0 | 5 | 0 | | | | |
| 75 | 1 | 5 | 0 | | | | | | | | | | | | |

Operation

If it is desired to dispense a mixture of twenty gallons of secondary fluid for every one hundred gallons of primary fluid, the operator would adjust the levers A, B and C to the positions indicated by the chart under the heading of 20%. In this case, the lever A would occupy the zero or locked position, the lever B would be adjusted so that the gear 129 thereof would mesh with the fourth step on the cone 103, and the lever B would also be locked out.

Now, if the valve 11 is open, liquid would flow through both of the meters 1 and 3, and the meter shafts 97 and 39 would be rotated at different speeds. The speed of shaft 97 would be governed solely by a differential pressure impressed upon the meter, while the speed of the shaft 39 would be governed by the differential pressure impressed upon the meter which is controlled by the valve 5. The speeds of the shaft 97 and screw 67 are in the ratio of five to one because of the setting of the arms A, B and C, and this proportion is maintained regardless of the speed of meter 1.

If it should happen that the valve 5 is not properly adjusted (let us assume that it is opened too far), then the speed of the meter 3 will be greater than that required to dispense liquid in the desired proportion. The shaft 43, driven by meter 3, and nut 37 will thus be driven at a speed greater than the speed of the screw 67. The nut will, accordingly, be drawn farther up on the screw 67, thus shifting the groove 35 in the nut to the right in Figure 2 or to the left in Figure 1. The clevis 33, moving with the nut 37, adjusts the lever arms 31 and 25 and the valve control rod 23 to the right in Figure 1 to adjust the valve 5 toward its closed position. This operation results in reducing the speed of meter 3 and the shaft 43, and is continued until the shaft 43 and screw 67 are operating at the same speed; whereupon, relative motion of the nut 37 and the screw 67 ceases. Should either of the meters 1 or 3, for any reason, speed up or slow down, the adjustment of valve 5 is at once effected to maintain the speeds in the proportion set by increasing or decreasing the speed of the meter 3.

The register 199, being driven from the shaft 97, indicates directly the volume dispensed through the meter 1. Since, as pointed out above, the speed of nut 67 is at all times, when the proportion is maintained, the same as the speed of the shaft 43; and, since the speed of the shaft is the same as that of the gears 95 and 181 which are the final drive gears of the speed change mechanism, the counter 191, which is driven from gear 181, represents directly the volume of liquid dispensed through the secondary meter 3.

The coupling 53 is provided so that the two meters may be disconnected by simply compressing the spring 55 so as to disengage pin 47 and shaft 43 from the slot 59 and sleeve 53. This may be desirable either in order to calibrate either one of the meters, or to dispense liquid from either of the meters without dispensing from the other. It will be seen that it is impossible to run one of the meters alone without breaking this connection; since, in case no liquid is passed through one of the meters, there would be relative motion between the nut 37 and screw 67 so that these would eventually jam and break the device.

A mixing device 13 serves to insure that the two fluids discharged are thoroughly mixed together before passing from the outlet pipe 15.

PROPORTIONING MORE THAN TWO FLUIDS SYSTEM 1

Figure 8:
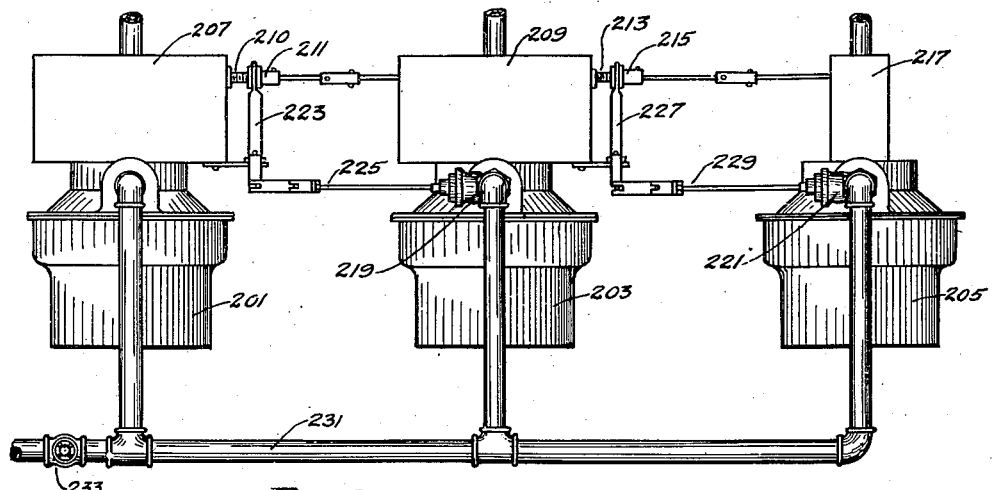
Figure 8 is an elevation showing three proportioning devices connected in series.

Figure 8 discloses a system for connecting three or more meters so that three or more liquids may be dispensed in predetermined proportion to each other. In this, figures 201, 203 and 205 represent respectively the maximum volume meter, the intermediate volume meter and the minimum volume meter. The speed change mechanism 207 is connected to be driven by meter 201, and the speed change mechanism 209 is connected to be driven by the meter 203.

Figure 5:
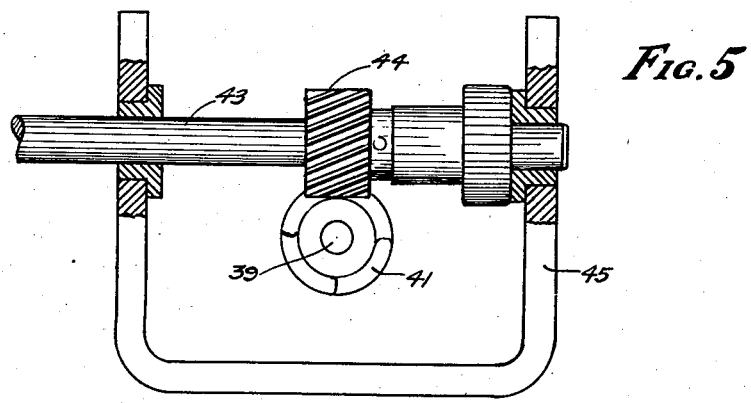
Figure 5 is a plan view, partly in section, showing the portion of the control mechanism which is driven by the inferior meter.

A screw 210 is driven by the speed change mechanism 207, while a nut 211 is driven by the speed change mechanism 209. The speed of the nut 211 is the same as the speed of the cone gear shaft of mechanism 209. A screw 213 is driven by the final drive gear of mechanism 209, and a nut 215 is driven through gearing 217 which is similar to the gearing 39 to 44 shown in Figure 5. The gearing 217 is driven from the meter 205. A valve 219 controls the outlet of meter 203, while a valve 221 controls the outlet of meter 205.

A lever 223, similar to that described in Figure 1, connects the nut 211 with the control rod 225 of valve 219; and a lever 227 connects nut 215 with the control rod 229 of valve 221.

The meters 201, 203 and 205 discharge into a manifold 231 and through an outlet control valve 233, and thence to the mixer 13, if this is to be used.

*Operation*

With the system disclosed in Figure 8, it is necessary to determine the proportion of liquid discharged by the secondary or intermediate meter 203 in terms of the liquid discharged by the primary or maximum quantity meter so that the speed change mechanism 207 may be set according to the chart disclosed above. And similarly, the proportion of the liquid to be discharged by the tertiary meter 205 must be known in terms of that discharged by the secondary meter 203 so that the required setting of the speed change mechanism 209 can be made.

For example, if it is desired to discharge one hundred gallons through meter 201, while at the same time fifty gallons are discharged through meter 203 and twenty-five gallons are discharged through the meter 205, the setting on the speed change mechanism 207 would be that indicated under the 50% row in the control chart. In other words, the bell crank A would be set at 1, while B and C would occupy the zero position.

Similarly, since the volume to be discharged by 205 is fifty per cent of that discharged by meter 203, the setting on the speed change mechanism 209 would be the same as that on 207. In other words, lever A would be set at 1, while levers B and C would occupy the zero position.

When valve 233 is opened, the meter 201 would be driven at a speed determined by the differential pressure impressed across it, while the speeds of meters 203 and 205 would be governed by the control valves 219 and 221 respectively. The differential mechanism, comprised of screw 210 and nut 211 through lever 223 and rod 225, will adjust the control valve 219 until the speeds of the nut and screw are the same. In this way, the proportion between meters 201 and 203 is established. In the same way, the screw 213 and nut 215 will adjust valve 221 through the lever 227 and rod 229 until the speeds of the nut and screw are the same; and in this way, the proportion between meters 203 and 205 is established.

Should there be an increase or decrease in the speed of meter 201, the speeds of meters 203 and 205 will be increased or decreased proportionally, due to the opening or closing of control valves 219 or 221 by means of the differential mechanism associated with these valves.

Should there be an increase or decrease of either of the meters 203 or 205, the control valve for this meter will be automatically adjusted by the associated differential mechanisms to bring the speed of the meter back to what it had been. It will be understood that as many intermediate meters, such as 203, as may be required may be connected in this type of system. For each meter a speed change mechanism and differential control mechanism will have to be supplied.

PROPORTIONING MORE THAN TWO FLUIDS SYSTEM 2

Figure 7:
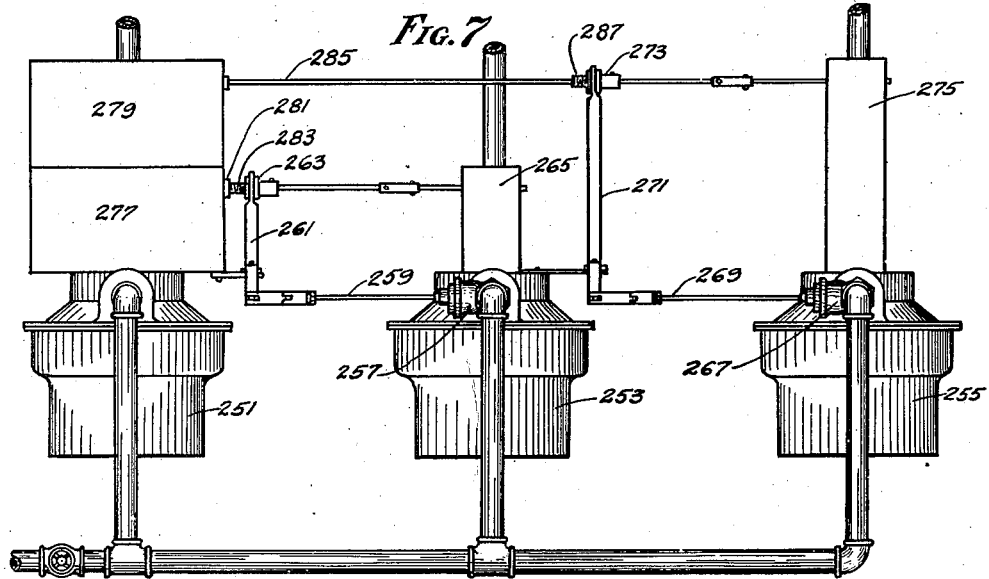
Figure 7 is an elevation showing three proportioning devices connected in parallel.

In Figure 7 is disclosed another system for proportioning the plurality of fluids which comprises a primary or maximum volume meter 251 and intermediate meters 253 and 255 which may be designated as secondary and tertiary meters respectively.

Meter 253 is provided with an outlet control valve 257 which is adjusted by means of a control rod 259 actuated by a lever 261 which receives its motion from a nut 263 of a differential mechanism. The nut 263 is driven by means of gearing 265 which is similar to the gearing 39 to 44 of Figure 1.

The meter 255 is provided with a control valve 267 which is adjusted by means of a control rod 269 which is actuated by a lever 271 which receives its motion from a nut 273 of a differential mechanism, which is, in turn, driven by gearing 275 which is similar to the gearing 265 just described.

Meter 251 is connected to drive two speed change mechanisms, 277 and 279 respectively. The final drive shaft 281, of the mechanism 277, drives a screw 283 which controls the motion of the nut 263, and consequently, the operation of the control valve 257. The final drive shaft 285, of the mechanism 279, drives a screw 286 which controls the motion of the nut 273, and consequently, the adjustment of the valve 267.

*Operation*

It will be seen that the mechanism disclosed in Figure 7 will dispense liquids from the intermediate meters in volumes which are proportionate to that dispensed through the primary or maximum volume meter 251.

For example, if it is desired to dispense one hundred gallons through the meter 251 in the same time that fifty gallons are dispensed through meter 253 and twenty-five gallons are dispensed through the meter 255, it will be necessary to set the levers A, B and C of the speed change mechanism 277 to the positions indicated under the 50% heading in the differential control chart above; while the levers A, B and C of the speed change mechanism 279 are set to the positions indicated under the 25% heading of said differential control chart. Thus the meter 253 is dispensing 50% as much liquid as the meter 251, while the meter 255 is dispensing 25% as much as the meter 251.

When the valve 289 is opened, the meter 251 will discharge liquid at a rate depending upon the pressure differential impressed upon it; and consequently, the shafts 281 and 285 will be driven at proportionate speeds depending on the settings of the speed change mechanisms 277 and 279. The meters 253 and 255 will be driven at speeds depending upon the adjustment of the valves 257 and 267 respectively.

The nut 263 and screw 283 will adjust the valve 257 to vary the speed of meter 253 and bring rotating speed of the nut 263 and screw 283 into coincidence. At the same time, the nut 273 and screw 287 will be adjusting the valve 267 and the speed of the meter 255 to render the rotating speeds of nut 273 and screw 287 the same. In this system, if meter 251 either increases or decreases its speed, the valves 257 and 267 will be independently adjusted to change the speed of their associated meters; if however, either one of the meters 253 or 255 changes its speed, the associated differential mechanism will adjust the valve for this meter to bring the speed back to what it originally was.

It will be seen that any number of intermediate meters may be connected in this system by supplying a unit comprising the speed change mechanism, differential mechanism, the gearing 275 and the control valve and linkage. This expansion of the system is limited only by the ability of the maximum volume meter to drive the change speed mechanisms required. The discharge of liquid may be passed from valve 289 through a suitable mixing mechanism, if this is desired.

It is apparent that various changes may be made in the size, form, construction and arrangement of parts without departing from the spirit of the invention; and accordingly, applicants do not desire to be limited to the specific forms herein described by way of illustration, but instead, desire protection falling reasonably within the scope of the appended claims.

We claim:

1. The combination of first, second and third meters, means for connecting each meter to a source of fluid, first and second differential mechanisms, each mechanism comprising one driving and two driven elements, first and second selectively settable speed change devices, each device comprising a driven and a driving shaft, means for connecting the driven shafts of said devices to said first and second meters respectively and means for connecting the driving shafts of said first and second devices to one of the driven elements of said first and second differential mechanisms respectively, first fixed ratio drive means connected between the said second meter and the second driven element of said first mechanism and second fixed ratio drive means connected between said third meter and the second driven element of said second mechanism, first and second valves connected with said second and third meters respectively to control the flow therethrough, means for connecting said first valve for control by the driving element of the first differential mechanism and additional means for connecting the second valve for control by the driving element of the second differential mechanism.

2. In a fluid proportioning mechanism, the combination of a first meter and a second meter, means connecting each meter to a source of fluid, a differential mechanism comprising two driven elements and a driving element, a selectively settable speed change device comprising a driven shaft and a driving shaft, means for connecting said driven shaft to said first meter and said driving shaft to one of said driven elements, a fixed ratio drive means connected between said second meter and the other driven element of said differential mechanism, a valve for controlling the flow through said second meter and means connecting said valve for operation by said driving element of said differential mechanism, a register mounted adjacent said first meter and connected to be driven thereby at a speed to indicate the volume of liquid dispensed by said first meter, and a second register mounted adjacent said first meter and connected to be driven at a speed proportional to that of the driving shaft of said speed change device so as to indicate the volume of liquid dispensed by said second meter.

3. In a fluid proportioning mechanism the combination of a primary meter and a plurality of intermediate meters, a plurality of speed change mechanisms connected to be driven by said primary meter, a differential mechanism associated with each of the intermediate meters and with a speed change mechanism, and having elements driven by said associated meter and mechanism, and a valve for each intermediate meter connected to be adjusted by the resultant motion of the associated differential to bring the driven elements to the same speed.

4. In a fluid proportioning mechanism the combination of first and second meters, means for connecting each meter to a source of fluid, a differential mechanism comprising two driven elements and a driving element, a selectively settable speed change device comprising a stepped cone gear connected to be driven by said first meter, a plurality of gear trains comprising driven gears mounted for movement to selectively engage with the various steps on said cone gear and comprising driving gears all of which are connected to drive a single final shaft by differential connecting means, means connecting said final drive shaft with one driven element of said differential mechanism, a fixed speed ratio drive connected between the other driven element of said differential mechanism and the second meter, a valve connected to control the flow through said second meter and means for connecting said valve with the driving element of said differential mechanism for control thereby.

5. In a fluid proportioning mechanism the combination of first and second meters, means for connecting each meter to a source of fluid, a differential mechanism comprising two driven elements and a driving element, a selectively settable speed change device comprising a stepped cone gear connected to be driven by said first meter, a plurality of gear trains comprising driven gears mounted for movement to selectively engage with the various steps on said cone gear and comprising driving gears all of which are connected to drive a single final shaft by differential connecting means, means for manually adjusting said driven gears into engagement with a selected step on the cone gear and for holding said gears in adjusted relation, means connecting said final drive shaft with one driven element of said differential mechanism, a fixed speed ratio drive connected between the other driven element of said differential mechanism and the second meter, a valve connected to control the flow through said second meter and means for connecting said valve with the driving element of said differential mechanism for control thereby.

6. In a fluid proportioning mechanism the combination of first and second meters, means for connecting each meter to a source of fluid, a differential mechanism comprising two driven elements and a driving element, a selectively settable speed change device comprising a stepped cone gear connected to be driven by said first meter, a plurality of gear trains comprising driven gears mounted for movement to selectively engage with the various steps on said cone gear and comprising driving gears all of which are connected to drive a single final shaft by means of two differential gear sets connected in parallel, said cone gear, gear trains and differential gear sets being so constructed and arranged as to permit adjustment in increments of one half of one percent of the maximum final drive speed and to have a range of at least two hundred increments, means connecting said final drive shaft with one driven element of said differential mechanism, a fixed speed ratio drive connected between the other driven element of said differential mechanism and the second meter, a valve connected to control the flow through said second meter and means for connecting said valve with the driving element of said differential mechanism for control thereby.

BRUCE W. GROSVENOR.
CLEMENT P. GRIFFITH.